United States Patent
Rech et al.

(10) Patent No.: US 9,959,752 B2
(45) Date of Patent: May 1, 2018

(54) APPARATUS AND METHOD FOR A RELAY STATION FOR VEHICLE-TO-VEHICLE MESSAGES

(71) Applicant: VOLKSWAGEN AG, Wolfsburg (DE)

(72) Inventors: Bernd Rech, Bokensdorf (DE); Teodor Buburuzan, Braunschweig (DE); Monique Engel, Braunschweig (DE); Stefan Gläser, Braunschweig (DE); Bernd Lehmann, Wolfsburg (DE); Sandra Kleinau, Rötgesbüttel (DE); Hendrik-Jörn Günther, Hannover (DE)

(73) Assignee: Volkswagen AG (DE)

(*) Notice: Subject to any disclaimer, the term of this patent is extended or adjusted under 35 U.S.C. 154(b) by 0 days. days.

(21) Appl. No.: 15/584,290

(22) Filed: May 2, 2017

(65) Prior Publication Data
US 2017/0323562 A1 Nov. 9, 2017

(30) Foreign Application Priority Data

May 3, 2016 (DE) .................. 10 2016 207 608

(51) Int. Cl.
G08G 1/16 (2006.01)
G08G 1/017 (2006.01)

(52) U.S. Cl.
CPC ............ *G08G 1/017* (2013.01); *G08G 1/161* (2013.01); *G08G 1/163* (2013.01); *G08G 1/166* (2013.01)

(58) Field of Classification Search
CPC .......... G08G 1/017; G08G 1/61; G08G 1/163; G08G 1/166
USPC ................................................. 340/901–905
See application file for complete search history.

(56) References Cited

U.S. PATENT DOCUMENTS

| 5,133,081 A | 7/1992 | Mayo |
| 2007/0160006 A1* | 7/2007 | Roggero .......... G08G 1/096775 370/331 |
| 2013/0038433 A1* | 2/2013 | Ullrich .................. G08G 1/161 340/425.5 |

(Continued)

FOREIGN PATENT DOCUMENTS

| DE | 10243695 A1 | 4/2004 |
| DE | 10245365 A1 | 6/2004 |
| DE | 69535394 T2 | 10/2007 |

(Continued)

OTHER PUBLICATIONS

Search Report for German Patent Application No. 10 2016 207 608.6; dated Nov. 28, 2016.

*Primary Examiner* — George Bugg
*Assistant Examiner* — Sharmin Akhter
(74) *Attorney, Agent, or Firm* — Barnes & Thornburg LLP (57) ABSTRACT

A device and to a method for a relay station for vehicle-to-vehicle messages. The relay station communicates using vehicle-to-vehicle messages via at least one antenna. The device includes an input interface to receive a vehicle-to-vehicle message via the at least one antenna and a control module to filter the vehicle-to-vehicle message based on a relevance of the vehicle-to-vehicle message for one or more receivers in a coverage area of the at least one antenna. The control module provides the filtered vehicle-to-vehicle message via an output interface via the at least one antenna if the vehicle-to-vehicle message is relevant for the one or more receivers.

16 Claims, 3 Drawing Sheets

(56) References Cited

U.S. PATENT DOCUMENTS

2013/0301406 A1 11/2013 Sakata
2016/0142491 A1* 5/2016 Engel ................. H04B 7/15507
　　　　　　　　　　　　　　　　　　　　　　340/902

FOREIGN PATENT DOCUMENTS

| DE | 102008052382 A1 | 4/2010 |
|----|-----------------|--------|
| GB | 2427789 A | 1/2007 |
| WO | 0124407 A1 | 4/2001 |
| WO | 2010045966 A1 | 4/2010 |

* cited by examiner

APPARATUS AND METHOD FOR A RELAY STATION FOR VEHICLE-TO-VEHICLE MESSAGES

PRIORITY CLAIM

This patent application claims priority to German Patent Application No. 10 2016 207 608.6, filed 3 May 2016, the disclosure of which is incorporated herein by reference in its entirety.

SUMMARY

Illustrative embodiments relate to a device and to a method for a relay station for vehicle-to-vehicle messages, more precisely, but not exclusively, based on providing filtered vehicle-to-vehicle messages based on a relevance filtering of the vehicle-to-vehicle messages.

BRIEF DESCRIPTION OF THE DRAWINGS

Disclosed embodiments will be described in greater detail in the text which follows referring to the drawings, which are generally not restricted overall. In the figures.

DETAILED DESCRIPTION

Vehicle-to-vehicle communication (also car2car, C2C or vehicle2vehicle, V2V) and vehicle-to-infrastructure communication (also car2infrastructure, C2I or vehicle2roadside, V2R) are a focal point of automobile research in the 21st century. The communication between vehicles or between vehicles or traffic infrastructure provides for a multiplicity of new possibilities, for example, a coordination of vehicles among one another or a communication of vehicles with the traffic infrastructure, for example, to provide congestion warnings for the vehicles. In this context, vehicles which are designed for C2C or C2I (combined also under vehicle-to-X communication, car2X, C2X or vehicle2X, V2X) have a transmitting and receiving unit to be able to communicate with other vehicles, for example, via direct radio links or mobile radio networks. In these contexts, the communication, for example, between vehicles or between vehicles and traffic infrastructure, can be limited within a radius of a few hundred meters.

Propagation paths of vehicle-to-vehicle messages are frequently restricted by obstacles—both non-static obstacles such as, for instance, other vehicles, and static obstacles such as, for instance, noise protection walls, tunnels, curves or bridge pillars frequently impede the communication and create areas into which no vehicle-to-vehicle messages can pass due to shading or a signal quality of the vehicle-to-vehicle messages is impaired. Thus, there is a need for an improved concept for the transmission of vehicle-to-vehicle messages.

Illustrative embodiments create, for example, a device for a relay station for vehicle-to-vehicle messages, for example, a repeater. The relay station can be designed to communicate via at least one antenna, for instance via two antennas which are mounted on different sides of a shading obstacle. The device is designed, for example, to receive messages and to provide receivers on the other side of the obstacle. In this context, the device can decode the vehicle-to-vehicle messages and analyze their content to decide which messages are relevant to receivers on the other side of the obstacle. If a vehicle-to-vehicle message is not relevant, it can be filtered out, for example, and not forwarded. The installation sites of relay stations and additional information such as, for instance, a statement from which areas messages are being forwarded can be entered, for example, in digital road maps.

Illustrative embodiments create a device for a relay station. The relay station is designed to communicate by means of vehicle-to-vehicle messages via at least one antenna. The device comprises an input interface designed for receiving a vehicle-to-vehicle message via the at least one antenna. The device also comprises a control module. The control module is designed to filter the vehicle-to-vehicle message on the basis of a relevance of the vehicle-to-vehicle message for one or a number of receivers in a coverage area of the at least one antenna. The control module is also designed to provide the filtered vehicle-to-vehicle message via an output interface via the at least one antenna if the vehicle-to-vehicle message is relevant for the one or more receivers. The device provides for an improved transmission of vehicle-to-vehicle messages in the case of obstacles in the transmission path and provides for a vehicle-to-vehicle communication through obstacles. The filtering operation provides for a reduction of the quantity of transmitted vehicle-to-vehicle messages and, as a consequence, a reduction of an occupancy of radio resources by forwarded vehicle-to-vehicle messages.

In some illustrative embodiments, the vehicle-to-vehicle message can be seen as representative of a plurality of vehicle-to-vehicle messages. For example, the input interface can be designed to receive the plurality of vehicle-to-vehicle messages and the control module can be designed to filter the plurality of vehicle-to-vehicle messages on the basis of the relevance to receive filtered vehicle-to-vehicle messages on the basis of the plurality of vehicle-to-vehicle messages and to provide the filtered vehicle-to-vehicle messages via the output interface.

In some illustrative embodiments, the input interface can be designed to receive the vehicle-to-vehicle message via at least one first antenna. The output interface can be designed to provide the filtered vehicle-to-vehicle message via at least one second antenna. The first antenna and the second antenna can be arranged on different sides of a shading obstacle. For the first antenna and the second antenna, different coverage areas can result. The control module can be designed to filter the vehicle-to-vehicle message on the basis of a relevance of the vehicle-to-vehicle message for one or more receivers in a coverage area of the second antenna. Receiving the vehicle-to-vehicle message via the first antenna and providing or sending the filtered vehicle-to-vehicle message via the second antenna enables the shading obstacle to be overcome whilst at the same time filtering the message in accordance with its relevance.

In some illustrative embodiments, the control module can be designed to determine the relevance of the vehicle-to-vehicle message on the basis of a content of the vehicle-to-vehicle message. This provides for a more efficient filtering of the vehicle-to-vehicle message on the basis of contents of the vehicle-to-vehicle message such as, for instance, position, trajectory, vehicle type or driving situation.

In some illustrative embodiments, the vehicle-to-vehicle message can comprise a position and/or trajectory of a vehicle from which the vehicle-to-vehicle message comes. The control module can be designed to determine the relevance of the vehicle-to-vehicle message on the basis of the position and/or trajectory of the vehicle. Determining the relevance on the basis of position and/or trajectory makes it possible, for example, to determine whether a trajectory of receivers intersects a trajectory of the vehicle from which the vehicle-to-vehicle message comes or whether the direction of traveling of the transmitter and of the receiver match.

In at least some illustrative embodiments, the control module can be designed to determine a logical direction of propagation of the received vehicle-to-vehicle message. The logical direction of propagation can correspond, for example, to a direction of propagation in the sense of a forwarding by multi-hop method (forwarding via a number of transmitter/receivers).

In at least some illustrative embodiments, the control module can be designed to filter the vehicle-to-vehicle message on the basis of the direction of propagation. This provides for an improved filtering of relevance since, for example, vehicle-to-vehicle messages can be sorted which come from vehicles which are not relevant for the receivers of the filtered vehicle-to-vehicle message provided, for instance due to their direction of travel or position.

In some illustrative embodiments, the control module can also be designed to provide information about the relay station for the one or more receivers. The information about the relay station enables the one or more receivers to assess the provided filtered vehicle-to-vehicle message and enables, for example, information to be provided about the obstacle or an environment of the obstacle.

In some illustrative embodiments, the control module can be designed to provide the information about the relay station with the filtered vehicle-to-vehicle message to the one or more receivers. This enables the message sent out and the information about the relay station to be utilized as additional payload.

Alternatively or additionally, the control module can be designed to determine an expected time of reception of the received vehicle-to-vehicle message on the basis of vehicle-to-vehicle messages previously received. The control module can be designed to provide the information about the relay station as infrastructure-to-vehicle message on the basis of the expected time of reception for the one or more receivers. For example, this can enable radio resources to be utilized which are not occupied by other vehicle-to-vehicle messages and/or the provision of the vehicle-to-vehicle message to be prioritized.

In at least some illustrative embodiments, the control module can be designed to determine information about a multiple reception of the vehicle-to-vehicle message by the one or more receivers. The control module can be designed to adapt the filtering of the vehicle-to-vehicle message also on the basis of the information about the multiple reception. Consideration of the information about the multiple reception can, for example, prevent or reduce a multiple reception of vehicle-to-vehicle messages and provide for a dynamic adaptation of the filtering which, for example, can take into consideration a current situation of reception.

In some illustrative embodiments, the control module can be designed to determine the information about the multiple reception on the basis of a position or trajectory of a vehicle from which the vehicle-to-vehicle message comes. By this means, it is possible, for example, to omit by filtering a forwarding of messages which are sent from positions from which it can be expected that vehicle-to-vehicle messages sent out from there reach the one or more receivers, for instance, by reflection.

Alternatively or additionally, the input interface can also be designed for receiving vehicle-to-vehicle messages via the second antenna. The control module can be designed to determine the information about the multiple reception on the basis of the vehicle-to-vehicle messages received via the second antenna. For example, the control module can be designed to monitor the vehicle-to-vehicle messages received via the second antenna to identify vehicle-to-vehicle messages which were to be received by the one or more receivers both through the relay station and also directly from the vehicle from which the vehicle-to-vehicle message comes to adapt on this basis, for example, filtering rules, for instance on the basis of a position of the vehicle from which the vehicle-to-vehicle message received several times comes.

Alternatively or additionally, the control module can also be designed to receive information about an acknowledgement of the filtered vehicle-to-vehicle message provided from the one or more receivers. The control module can be designed to determine the information about the multiple reception on the basis of the information about the acknowledgement. For example, the control module can be designed to identify on the basis of the information about the acknowledgement, vehicle-to-vehicle messages which have been received both through the relay station and also directly from the vehicle from which the vehicle-to-vehicle message comes, by the one or more receivers to adapt, based thereon, for example, filtering rules for instance based on a position of the vehicle from which the vehicle-to-vehicle message received several times comes.

Illustrative embodiments also create a method for a relay station. The relay station is designed to communicate by means of vehicle-to-vehicle messages via at least one antenna. The method comprises receiving a vehicle-to-vehicle message via the at least one antenna. The method also comprises filtering of the vehicle-to-vehicle message on the basis of a relevance of the vehicle-to-vehicle message for one or more receivers in a coverage area of the at least one antenna. The method also comprises providing the filtered vehicle-to-vehicle message via the at least one antenna if the vehicle-to-vehicle message is relevant for the one or more receivers.

Illustrative embodiments also create a program comprising a program code for performing the method when the program code is carried out on a computer, a processor, a control module or a programmable hardware component.

Various illustrative embodiments will now be described in greater detail with reference to the attached drawings in which some illustrative embodiments are shown. In the figures, the dimensions of thickness of lines, layers and/or regions can be shown and exaggerated for the sake of clarity.

In the subsequent description of the attached figures, which only show some exemplary embodiments, identical reference symbols can designate identical or comparable components. Furthermore, combinatory reference symbols can be used for components and objects which occur several times in an illustrative embodiment or in a drawing but are described jointly with regard to one or several features. Components or objects which are described with identical or combinatory reference symbols can be designed identically but possibly also differently with regard to individual, several or all features, for example, their dimensionings, unless something different is obtained from the description explicitly or implicitly.

Although illustrative embodiments can be modified and altered in various ways, illustrative embodiments are shown as examples in the figures and are described in detail herein. However, it should be explained that it is not intended to restrict illustrative embodiments to the forms disclosed in each case but that illustrative embodiments, instead, should cover all functional and/or structural modifications, equivalents and alternatives which are within the field of the disclosed embodiments. Identical reference symbols designate identical or similar elements in the entire description of the figures.

It should be noted that an element which is designated as "connected" or "coupled" to another element can be directly connected or coupled to the other element or that there can be intermediate elements. If, in contrast, an element is designated as "directly connected" or "directly coupled" to another element, there are no intermediate elements. Other terms which are used for describing the relationship between elements should be interpreted in a similar way (e.g., "between" compared with "directly between", "adjoining" compared with "directly adjoining" etc.).

The terminology which is used herein is only used for describing certain illustrative embodiments and should not restrict the illustrative embodiments. As used herein, the singular forms "one", "a", "of an" and "the" should also include the plural forms as long as the context does not unambiguously specify anything else. Furthermore, it should be pointed out that the expressions such as, e.g., "includes", "including", "has", "comprises", "comprising" and/or "having", as used herein, specify the presence of mentioned features, whole numbers, operations, work sequences, elements and/or components but do not exclude the presence or the addition of one or one or more features, whole numbers, operations, work sequences, elements, components and/or groups therefrom.

As long as nothing else is defined, all terms used herein (including technical and scientific terms) have the same meaning attributed to them by an average expert in the field to which the illustrative embodiments belong. It should also be explained that expressions, e.g., those which are defined in generally used dictionaries should be interpreted in such a way as if they had the meaning which is consistent with their meaning in the context of the relevant technology and should not be interpreted in an idealized or excessively formal sense unless this is expressly defined herein.

In the vehicle-to-vehicle communication and the vehicle-to-infrastructure communication (ad-hoc communication in the near field, called V2X communication in the text which follows), the quality of communication is frequently dependent on location. The best communication quality and highest probability of reception exists in most cases with a free view. Buildings, bridges, hills, forestry et al. reduce the probability of reception. Noise protection walls can have a disturbing effect, e.g., on freeway sliproads. Noise protection walls can lead, for example, to the communication between vehicles on the freeway and vehicles on the sliproad being disturbed.

At least some illustrative embodiments relate to a V2X repeater which improves poor V2X communication caused by topology or structural situations in that it forwards V2X signals. Conventional systems are extended by attachments to the antenna arrangement and message filtering (selective repeater). Illustrative embodiments will be explained in the text which follows using the example of a freeway sliproad with a noise protection wall.

The repeater used is in at least some illustrative embodiments an ITS roadside station (transceiver station of an intelligent transport system at the roadside) which is permanently installed at a suitable position in at least one illustrative embodiment. In special cases such as, e.g., on construction sites, in the case of accidents, special events or also in case of catastrophe, ITS roadside stations can also be set up temporarily, e.g., integrated in construction site protection systems (e.g., blocking trailer, c.f. cooperative ITS corridor). The repeater or the ITS roadside station, respectively, can correspond, for example, to a relay station 100 of FIG. 1. In some illustrative embodiments, vehicles, for instance, operational vehicles of the police, of the fire department, of the technical assistance units and of the military can be switched into a corresponding roadside mode so that these, too, can have the repeater function.

Figure 1:
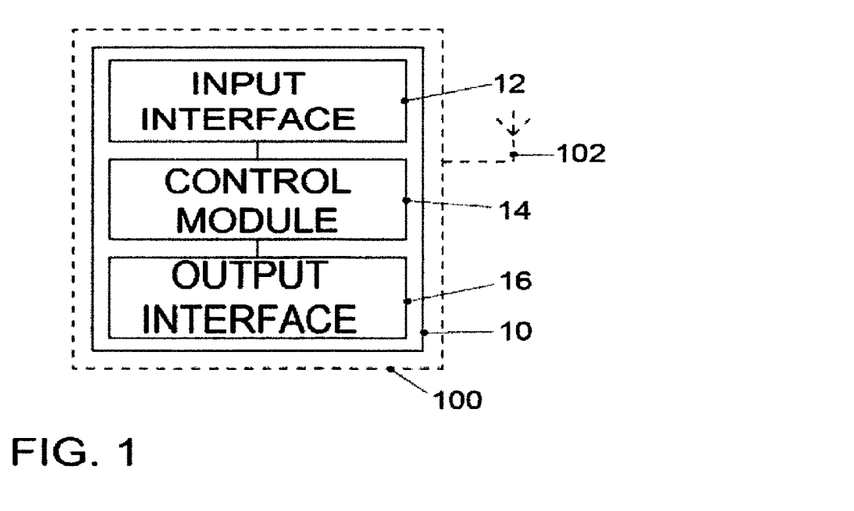
FIG. 1 illustrates a block diagram of an illustrative embodiment of a device for a relay station.

A repeater in the sense of the disclosed embodiments has at least one antenna, one transmitting and receiving device (for example, an input interface 12 and an output interface 16 from FIG. 1) and a unit for message processing (for example, a control module 14 from FIG. 1). Depending on the local situations, a number of antennas and a number of transmitting and receiving units can also be installed such as, e.g., when ITS roadside stations communicating with one another (e.g., cable-connected) implement a repeater function.

Figure 2:
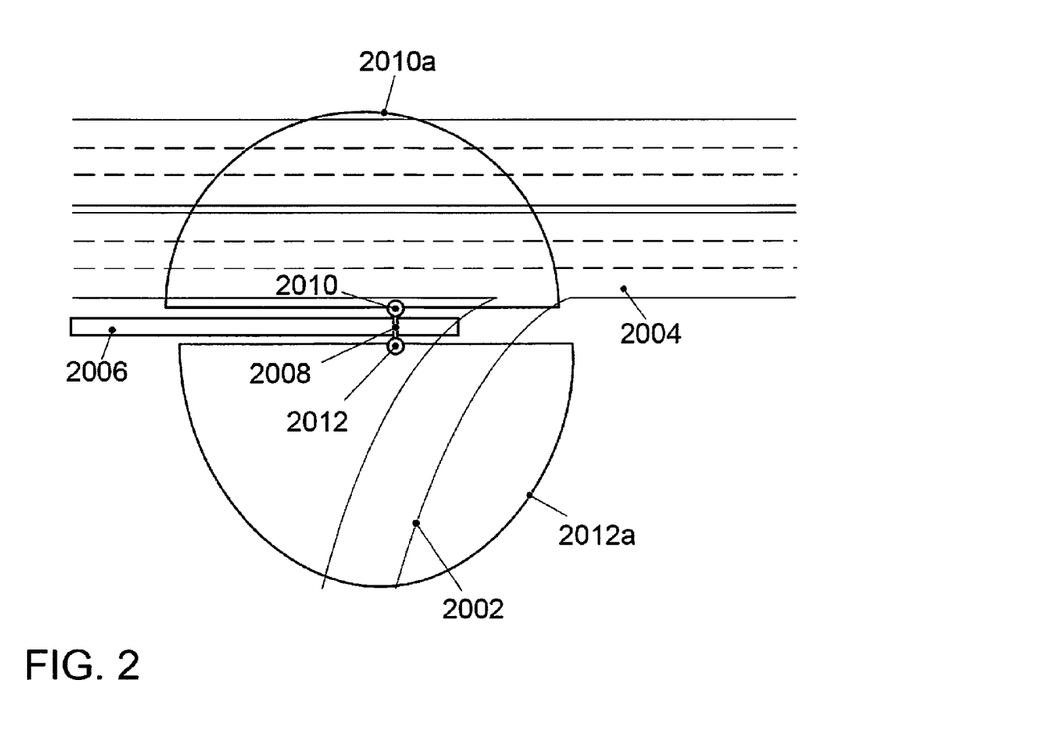
FIG. 2 shows an illustrative embodiment.

FIG. 2 shows illustratively an exemplary embodiment of a sliproad 2002 on a freeway 2004 having noise protection walls 2006. In this case, an ITS roadside station 2008 having antennas 2010; 2012 on each side of the noise protection wall is installed. An illustrative embodiment of the ITS roadside station having its own transmitting and receiving unit at each antenna (i.e., in this case on each side of the noise protection wall) is also conceivable which exchange data with one another (optionally, cable-connected). This can be appropriate or even required from the point of view of signal processing if the antennas have to be mounted spatially far apart from one another. A corresponding situation can be imagined on buildings where the transmitting and receiving units are mounted at different house sides. This concept can also be extended to a number of buildings. Correspondingly, complete ITS roadside stations can be used. For the organization and the management of the data exchange, the monitoring of the communication channel and for handling of further tasks (e.g., tasks in the case of cooperations between vehicles), at least one unit for message processing (for example, a device 10 from FIG. 1) or at each transmitting and receiving unit a unit for message processing is provided in some illustrative embodiments at each transmitting and receiving unit.

In the case of V2X repeaters having a number of antennas, these have in each case a directional characteristic in some illustrative embodiments. Their design depends, for example, on the local situations. The principle is shown in FIG. 2. The directional characteristics 2010a; 2012a, shown here idealized, form sections of circles which point in the direction of the vehicles with which it is intended to communicate. In the direction of the noise protection wall, it may not be possible to communicate by radio in some illustrative embodiments. In some illustrative embodiments, the communication of the V2X repeater is subject to the requirement that it transmits the vehicle messages unchanged and without delay, if possible, in a spatial area to be defined. In at least some illustrative embodiments, the repeater can perform filtering and not transmit messages from all vehicles. In at least one disclosed embodiment, the repeater can be designed to transmit no messages from vehicles which are irrelevant for the receiver vehicles for traffic reasons. These can be, for example, vehicles on other roads such as, on a freeway, the vehicles from the opposite direction or vehicles on a crossing bridge.

FIG. 1 illustrates a block diagram of an illustrative embodiment of a device 10 for a relay station 100. The relay station 100 is designed to communicate by means of vehicle-to-vehicle messages via at least one antenna 102. The relay station 100 can correspond, for example, to a repeater for vehicle-to-vehicle messages or to an ITS roadside station. In some illustrative embodiments, the relay station 100 can comprise one or more ITS roadside stations.

The device 10 comprises an input interface 12 designed for receiving a vehicle-to-vehicle message via the at least one antenna 102. The device 10 also comprises a control module 14 designed for filtering the vehicle-to-vehicle message on the basis of a relevance of the vehicle-to-vehicle message for one or more receivers in a coverage area of the at least one antenna 102. The control module 14 is also designed for providing the filtered vehicle-to-vehicle message via an output interface 16 via the at least one antenna 102 if the vehicle-to-vehicle message is relevant for the one or more receivers. The vehicle-to-vehicle message could, for example, be relevant for the one or more receivers if the predicted trajectory of the transmitting vehicle and the one or more receivers can cross or the transmitting vehicle has influence on the receiver, for instance because it is a rescue vehicle. For example, the vehicle-to-vehicle message can be relevant because it comes from a vehicle which is located or will be located within an environment around the one or more receivers.

Figure 3:
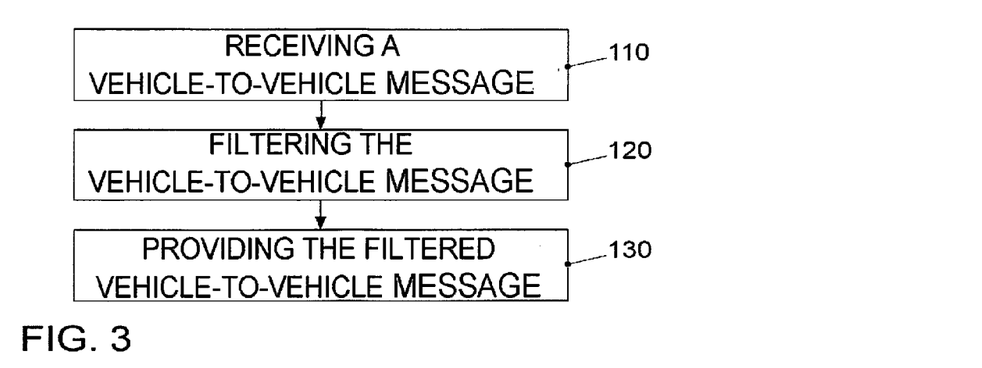
FIG. 3 illustrates a flowchart of an illustrative embodiment of a method for a relay station.

FIG. 3 illustrates a flowchart of an illustrative embodiment of a method for the relay station 100. The control module 14 can be designed, for example, for carrying out the method. The method comprises receiving 110 the vehicle-to-vehicle message via the at least one antenna 102. The method also comprises filtering 120 of the vehicle-to-vehicle message on the basis of a relevance of the vehicle-to-vehicle message for one or more receivers in a coverage area of the at least one antenna 102. The method also comprises providing 130 the filtered vehicle-to-vehicle message via the at least one antenna 102 if the vehicle-to-vehicle message is relevant for the one or more receivers. Further developments of the control module 14 can be mapped, for example, correspondingly onto the method operations of the method.

In some illustrative embodiments, the vehicle-to-vehicle communication can take place, for example, via a shared communication channel (broadcast channel). The input interface 12 and the output interface 16 can be comprised, for example, in a vehicle-to-vehicle interface or coupled to at least one vehicle-to-vehicle interface. The output interface 16 can be designed, for example, for providing the vehicle-to-vehicle message for a number of receivers (also broadcast). The communication via vehicle-to-vehicle messages can be performed, for example, in accordance with IEEE 802.11p (a standard of the Institute of Electrical and Electronics Engineers). The output interface 16 and/or the input interface 12 can be designed to communicate in accordance with a vehicle-to-vehicle communication standard, for instance IEEE 802.11p. The vehicle-to-vehicle message can correspond, for example, to an event-based message, for example, a Decentralized Environmental Notification Message (DENM). Alternatively, the vehicle-to-vehicle message can correspond to a periodic status message, for instance a Cooperative Awareness Message CAM. The vehicle-to-vehicle message can also correspond to a safety message, for instance a Basic Safety Message (BSM) of a vehicle-to-vehicle message with information about an environment of the transmitting vehicle or a driving intention message.

In some illustrative embodiments, receiving of the vehicle-to-vehicle message can correspond, for example, to receiving the vehicle-to-vehicle message from a transceiving module of the relay station 100. Alternatively, the receiving can correspond, for example, to the receiving of a signal which comprises the vehicle-to-vehicle message, via the at least one antenna 102 and a decoding of the signal for receiving the vehicle-to-vehicle message.

In some illustrative embodiments, the filtering can correspond, for example, to permitting, discarding or filtering out the vehicle-to-vehicle message on the basis of a filtering criterion. The filtering criterion can be based, for example, on the relevance of the message and/or a received power of the message. The filtering can indicate, for example, if the vehicle-to-vehicle message is to be provided, transmitted or forwarded, or not.

In at least some illustrative embodiments, providing the filtered vehicle-to-vehicle message can correspond to providing the vehicle-to-vehicle message for a transceiving unit of the relay station 100. Alternatively, providing the filtered vehicle-to-vehicle message can correspond to encoding the filtered vehicle-to-vehicle message and sending the encoded filtered vehicle-to-vehicle message or to forwarding of the received vehicle-to-vehicle message.

Figure 1A:
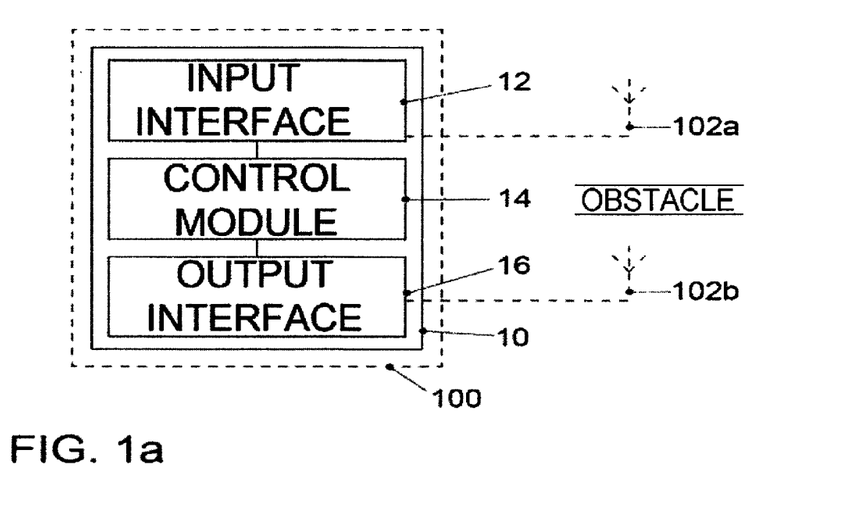
FIG. 1a illustrates a block diagram of a further illustrative embodiment of a device for a relay station having two antennas which are mounted on different sides of a shading obstacle.

In at least some illustrative embodiments, the input interface 12, as shown in FIG. 1a, can be designed to receive the vehicle-to-vehicle message via at least one first antenna 102a. The output interface 16 can be designed to provide the filtered vehicle-to-vehicle message via at least one second antenna 102b. The first antenna 102a and the second antenna 102b can be arranged, for example, on different sides of a shading obstacle so that different coverage areas result for the first antenna 102a and the second antenna 102b. The control module 14 can be designed, for example, to filter the vehicle-to-vehicle message on the basis of a relevance of the vehicle-to-vehicle message for one or more receivers in a coverage area of the second antenna 102b. The shading obstacle can impair, for example, a reception of the vehicle-to-vehicle message by the receiver and/or effect an attenuation of the signal.

In at least some illustrative embodiments, the antenna 102, the first antenna 102a and/or the second antenna 102b can correspond to a technical device for sending and/or receiving electromagnetic waves and/or, for example, comprise at least one element of the group of antenna with directional characteristic, planar antenna, group antenna, broadcast antenna, vertical radiator and dipolar antenna.

Figure 3A:
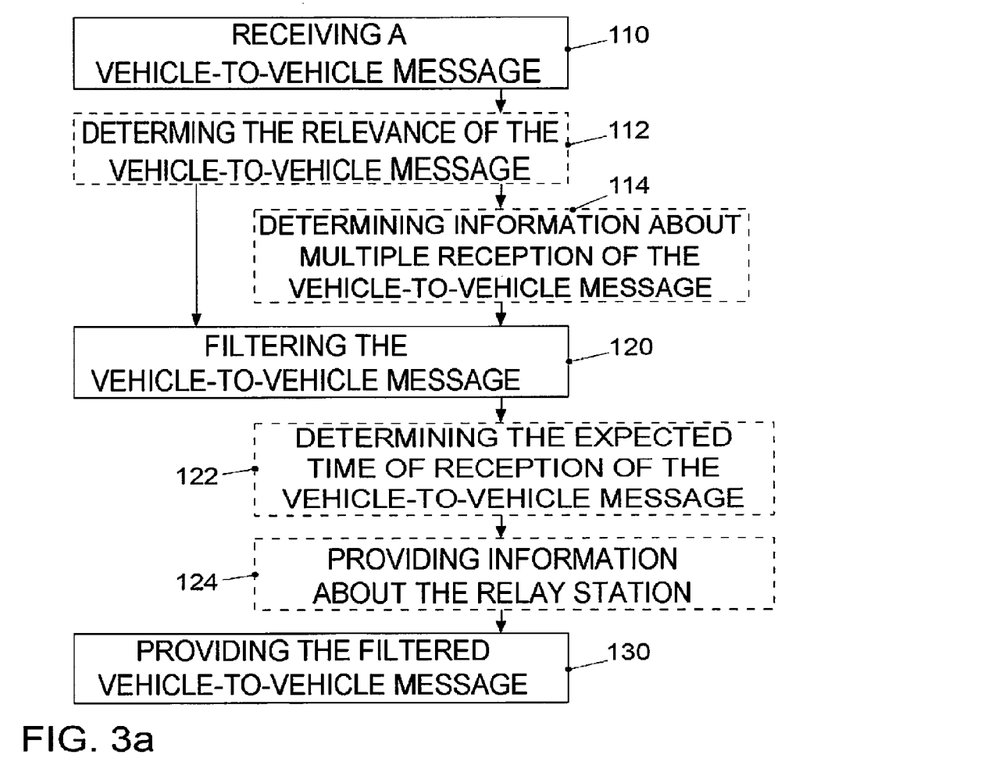
FIG. 3a illustrates a flowchart of a further illustrative embodiment of a method for a relay station.

For example, the control module 14 can be designed to determine the relevance of the vehicle-to-vehicle message on the basis of a content of the vehicle-to-vehicle message. For example, the control module 14 can be designed to decode the vehicle-to-vehicle message for determining the relevance of the vehicle-to-vehicle message. FIG. 3a shows a further illustrative embodiment of the method, also comprising the determining of the relevance of the vehicle-to-vehicle message 112.

The vehicle-to-vehicle message can comprise, for example, a position and/or trajectory of a vehicle from which the vehicle-to-vehicle message comes (transmitter vehicle). The control module 14 can be designed, for example, to determine the relevance of the vehicle-to-vehicle message on the basis of the position and/or the trajectory of the vehicle. For example, the control module 14 can be designed to determine the relevance on the basis of a first area of positions, the first area specifying that messages which have been sent within this area are relevant. Alternatively or additionally, the control module 14 can be designed to determine the relevance on the basis of a second area of positions, the second area specifying that messages which have been sent within this area are not relevant. The control module 14 can be designed, for example, to store the first and/or second area of positions and, for example, to adapt it on the basis of information about vehicle-to-vehicle messages received several times.

In an exemplary illustrative embodiment, a spatial area may for instance be defined from which messages are to be forwarded. In a simple case, e.g., a distance range could be specified (e.g., within a radius of 500 m, to be derived from the position information of the vehicle in the CAM). However, the area could also be selected additionally in accordance with the course of the street or the topology. Furthermore, a criterion could be the traveling time to a particular location (e.g., how long it would take until possible traveling paths will intersect).

For example, the control module 14 can be designed to determine the direction of traveling of the transmitter vehicle. The control module 14 can be designed, for example, to determine the relevance on the basis of the direction of travel of the transmitter vehicle. For example, the control module 14 could be designed to grade a vehicle-to-vehicle message as relevant if the direction of travel of the transmitter vehicle and of the vehicles within the coverage area of the at least one antenna are matched. Alternatively or additionally, the control module 14 can be designed to determine the road on which the transmitter vehicle is moving and to determine the relevance also on the road on which the transmitter vehicle is moving. In at least some illustrative embodiments, the control module 14 can be designed, for example, to determine a direction of propagation of the received vehicle-to-vehicle message on the basis of the position and/or trajectory. In some illustrative embodiments, the control module 14 can also be designed to filter the vehicle-to-vehicle message on the basis of a distance of the vehicle which has provided the vehicle-to-vehicle message, to the one or more receivers, for example, to filter out messages, the distance of which is greater than a distance threshold value. The control module 14 can also be designed, for example, to provide the filtered vehicle-to-vehicle message on the basis of the direction of propagation. For example, the control module 14 can be designed to filter the vehicle-to-vehicle message in such a way that messages which can also reach the receiver in a direct way are filtered out.

For example, the control module 14 can be designed to determine information about a multiple reception of the vehicle-to-vehicle message by the one or more receivers. FIG. 3a also shows the corresponding method operation at 114. The control module 14 can be designed, for example, to adapt the filtering of the vehicle-to-vehicle message also on the basis of the information about the multiple reception or to filter the vehicle-to-vehicle message on the basis of the information about the multiple reception.

For example, the control module 14 can be designed to determine the information about the multiple reception on the basis of a position or trajectory of a vehicle from which the vehicle-to-vehicle message comes. For example, the control module 14 can be designed to filter out messages from vehicles, the position or trajectory of which is within a range of positions within which direct receiving of the vehicle-to-vehicle message is or appears to be possible. For example, messages from vehicles which are located in parallel with a gap of the shading obstacle can be filtered out, for instance to prevent a multiple reception.

Frequently, there are, for example, areas which are both within the range of reception of the V2X repeater and also within the range of an adequate communication between the vehicles. If messages from vehicles in this area are forwarded by the repeater, the receiving vehicles possibly receive them several times, once directly from the transmitting vehicle and then with a short delay and possibly a greater signal strength again from the relay station. In the receiver vehicle this appears similar to a reflection of the message. In some illustrative embodiments, the filtering of the vehicle-to-vehicle message can be based on avoiding a multiple reception. In some illustrative embodiments, vehicle-to-vehicle messages can be filtered out of an area correspondingly to be defined.

Alternatively or additionally, the input interface 12 could also be designed to receive vehicle-to-vehicle messages via the second antenna 102b. The control module 14 can be designed, for example, to determine the information about the multiple reception on the basis of the vehicle-to-vehicle messages received via the second antenna 102b. For example, the control module 14 could be designed to filter out vehicle-to-vehicle messages which have been received via both antennas to reduce or prevent the multiple reception of messages by the receiver. For example, the control module 14 could be designed to adapt the first and/or second area of positions on the basis of the messages received via both antennas, for example, on the basis of a position and/or trajectory of the vehicle which the vehicle-to-vehicle message has provided. Alternatively or additionally, the control module 14 can also be designed to receive information about a confirmation of the filtered vehicle-to-vehicle message provided from the one or more receivers, for example, via the input interface 12 and the second antenna 102b. The control module 14 can be designed to determine the information about the multiple reception on the basis of the information about the confirmation. For example, the information about the confirmation (also acknowledgment) can correspond to an ACK (acknowledgment) message. For example, the information about the acknowledgment can indicate that a message has been received several times, for example, from the transmitter vehicle and the relay station 100. The control module 14 can be designed, for example, to adapt the filtering on the basis of the information about the acknowledgment. For example, the control module 14 can be designed to filter out a range of positions which indicates that vehicle-to-vehicle messages sent by transmitter vehicles within the range are to be filtered out on the basis of the information about the acknowledgment or to be adapted on the basis of the vehicle-to-vehicle messages received twice.

Alternatively or additionally to the filtering according to relevancy of the vehicle-to-vehicle message, the control module 14 can also be designed to filter the vehicle-to-vehicle message on the basis of a received power of the received vehicle-to-vehicle message. For example, the control module 14 can be designed to filter out vehicle-to-vehicle messages with a received power which is below a threshold value.

In some illustrative embodiments, the control module 14 can also be designed to provide information about the relay station 100 for the one or more receivers.

FIG. 3a shows the corresponding method operation at 124. The information about the relay station 100 can comprise, for example, information about a surveyed installation site of the relay station 100, information about a local digital map or information about at least one area of positions from which methods are forwarded (e.g., corresponding entry in the map).

In some illustrative embodiments, the control module 14 can be designed, for example, to provide the information about the relay station 100 with the filtered vehicle-to-vehicle message for the one or more receivers. For example, the filtered message can comprise a header area, a payload or repeater area and an information area. The header can comprise, for example, information about a protocol version used, a message identification and an identification of the relay station. The payload/repeater area can comprise the complete vehicle-to-vehicle message to be forwarded. The information area can comprise the information about the relay station.

To meet the requirement for a forwarding of V2X messages that is as immediate as possible, the repeater area and the information area cannot be sent out simultaneously in a vehicle-to-vehicle message (repeater message) in some illustrative embodiments. Since the information area comprises static messages, the rate of repetition of corresponding vehicle-to-vehicle messages with information about the relay station can be less than the rate of repetition of the filtered vehicle-to-vehicle message. The rate of repetition of the vehicle-to-vehicle messages with information about the relay station can be specified, for example, as 1 Hz.

The control module 14 can be designed, for example, to determine an expected time of reception of the received vehicle-to-vehicle message on the basis of previously received vehicle-to-vehicle messages. FIG. 3a shows the corresponding method operation at 122. The control module 14 can be designed to provide the information about the relay station as infrastructure-to-vehicle message on the basis of the projectable time of reception for the one or more receivers.

The transmitting times of the information about the relay station cannot be firmly specified, for example, but selected in such a manner that the V2X messages to be forwarded have priority. The control module 14 can be designed, for example, to determine corresponding gaps between the repeater payload messages with filled-in repeater field (filled with V2X message to be forwarded). For this purpose, the control module 14 can be designed to analyze the occurrence of messages and to predict the next transmitting times of messages which have to be transmitted (with consideration of the filtering criteria). This is possible, for example, with knowledge of the speeds and the spatial distribution of the transmitting vehicles and the knowledge of the communication channel. The control module 14 can be designed to predict the movements of the vehicles and on the basis of the transmitting rules (CAM rate of repetition, Decentralized Congestion Control DCC are specified and known) determine the transmitting time of the information about the relay station 100. Thus, an actual rate of repetition of the information about the relay station 100 can be produced which varies about the nominal value.

The input interface 12 can correspond, for example, to one or more inputs for receiving information, for instance in digital bit values, based on a code, within a module, between modules or between modules of different entities. For example, the input interface 12 can be coupled to at least one transceiving device of the relay station 100 or at least one transceiving device of an antenna of the relay station 100. Alternatively or additionally, the input interface 16 can be designed for receiving the vehicle-to-vehicle message from a first ITS roadside station. Alternatively or additionally, the input interface 12 can also comprise a receiving device of the relay station 100.

The output interface 16 can correspond, for example, to one or more inputs and/or one or more outputs for receiving and/or transmitting information, for instance in digital bit values, based on a code, within a module, between modules or between modules of various entities. For example, the output interface 16 can be coupled to at least one transceiving device of the relay station 100 or at least one transceiving device of an antenna of the relay station 100. Alternatively or additionally, the output interface 16 can be designed to provide the vehicle-to-vehicle message of a second ITS roadside station. Alternatively or additionally, the output interface 16 can also comprise a transmitting device of the relay station 100.

In at least some illustrative embodiments, the terms first antenna 102a and second antenna 102b can be used alternatively. For example, the input interface 12 can be designed to receive the vehicle-to-vehicle message via the second antenna 102b and the output interface 16 can be designed to provide the filtered vehicle-to-vehicle message via the first antenna 102a. For example, the control module 14 can be designed to provide the vehicle-to-vehicle message based on the antenna via which the vehicle-to-vehicle message has been received, for example, via the first antenna 102a or the second antenna 102b or to filter the vehicle-to-vehicle message based on the antenna via which the vehicle-to-vehicle message has been received.

Illustrative embodiments also create the relay station 100 comprising the device 10. In some illustrative embodiments, the device 10 and/or the relay station 100 can comprise the at least one antenna 102 and/or the first antenna 102a and the second antenna 102b.

In illustrative embodiments, the control module 14 can correspond to an arbitrary controller or processor or a programmable hardware component. For example, the control module 14 can also be implemented as software which is programmed for a corresponding hardware component. To this extent, the control module 14 can be implemented as programmable hardware with correspondingly adapted software. In this context, arbitrary processors such as digital signal processors (DSPs) can be used. Illustrative embodiments are here not restricted to a particular type of processor. Any processors or also a number of processors are conceivable for implementing the control module 14.

A further illustrative embodiment is a computer program for performing at least one of the methods described above when the computer program is running on a computer, a processor or a programmable hardware component. A further illustrative embodiment is also a digital storage medium which is machine- or computer-readable and which has electronically readable control signals which can interact with a programmable hardware component so that one of the methods described above is carried out.

The features disclosed in the above description, the subsequent claims and the attached figures can be of significance and implemented both individually and in arbitrary combination in their various embodiments for realizing an illustrative embodiment.

Although some embodiments have been described in conjunction with a device, these embodiments, naturally, also represent a description of the corresponding method so that a block or a component of a device is also understood to be a corresponding method operation or a feature of a method operation. Analogously, embodiments which have been described in conjunction with a method operation or as a method operation also represent a description of a corresponding block or details or features of a corresponding device.

Depending on requirements for implementation, illustrative embodiments can be implemented in hardware or software. The implementation can be carried out by using a digital storage medium, for example, a floppy disk, a DVD, a Blu-Ray disc, a CD, a ROM, a PROM, an EPROM, an EEPROM or a FLASH memory, a hard disk or another magnetic or optical memory on which electrically readable control signals are stored which can or do interact with a programmable hardware component in such a manner that the respective method is performed.

A programmable hardware component can be formed by a processor, a computer processor (CPU=Central Processing Unit), a graphics processor (GPU=Graphics Processing Unit), a computer, a computer system, an ASIC (Application-Specific Integrated Circuit), an IC (Integrated Circuit), a SOC (System On Chip), a programmable logic element or an FPGA (Field Programmable Gate Array) with a microprocessor.

The digital storage medium can, therefore, be machine- or computer-readable. Some illustrative embodiments, therefore, comprise a data carrier which has electronically readable control signals which can interact with a programmable computer system or a programmable hardware component in such a manner that one of the methods described herein is performed. An illustrative embodiment is thus a data carrier (or a digital storage medium or a computer-readable medium) on which the program for performing one of the methods described herein is recorded.

In general, illustrative embodiments can be implemented as program, firmware, computer program or computer program product with a program code or as data, the program code or the data being effective in performing one of the methods when the program is running on a processor or a programmable hardware component. The program code or the data can also be stored, for example, on a machine-readable carrier or data carrier. The program code or the data can be present as, among other things, source code, machine code or byte code and as another intermediate code.

Furthermore, a datastream, a signal sequence or a sequence of signals which represents or represent the program for performing one of the methods described herein is or are a further illustrative embodiment. The data stream, the signal sequence or the sequence of signals can be configured, for example, with the aim of being transferred via a data communication link, for example, via the Internet or another network. Illustrative embodiments are thus also signal sequences representing data which are suitable for transmission via a network or a data communication link, the data representing the program.

A program according to an illustrative embodiment can implement one of the methods during its performance, for example, in that it reads out storage locations or writes into these a data item or a number of data as a result of which, if necessary, switching processes or other processes are produced in transistor structures, in amplifier structures or in other electrical, optical, magnetic components or components operating in accordance with another functional principle. Correspondingly, data, values, sensor values or other information items can be acquired, determined or measured by a program by reading out a storage location. A program can, therefore, acquire, determine or measure quantities, values, measurement quantities and other information by reading out one or more storage locations and produce, initiate or perform an action and drive other devices, machines and components by writing into one or more storage locations.

The illustrative embodiments described above only represent an illustration of the principles of the disclosure. Naturally, modifications and variations of the arrangements and details described herein will be obvious to other experts. It is intended, therefore, that the disclosure is only restricted by the protective range of the subsequent patent claims and not by the specific details which have been presented herein by means of the description and the explanation of the illustrative embodiments.

LIST OF REFERENCE DESIGNATIONS

10 Device
12 Input interface
14 Control module
16 Output interface
100 Relay station
102 At least one antenna
102a First antenna
102b Second antenna
110 Receiving a vehicle-to-vehicle message
112 Determining the relevance of the vehicle-to-vehicle message
114 Determining information about multiple reception of the vehicle-to-vehicle message
120 Filtering the vehicle-to-vehicle message
122 Determining the expected time of reception of the vehicle-to-vehicle message
124 Providing information about the relay station
130 Providing the filtered vehicle-to-vehicle message
2002 Sliproad
2004 Freeway
2006 Noise protection wall
2008 ITS roadside station
2010 Antenna
2010a Directional characteristic of the antenna
2012 Antenna
2012a Directional characteristic of the antenna

The invention claimed is:

1. A device for a relay station for communicating vehicle-to-vehicle messages via at least one antenna, the device comprising:
an input interface for receiving a vehicle-to-vehicle message via the at least one antenna; and
a control module comprising a processor to:
determine on a relevance of the vehicle-to-vehicle message for one or more receivers in a coverage area of the at least one antenna;
filter the vehicle-to-vehicle message based on the determined relevance of the vehicle-to-vehicle message for the one or more receivers in the coverage area of the at least one antenna; and
output the filtered vehicle-to-vehicle message via an output interface via the at least one antenna in response to the vehicle-to-vehicle message being relevant for the one or more receivers,
wherein the input interface receives the vehicle-to-vehicle message via at least one first antenna and wherein the output interface provides the filtered vehicle-to-vehicle message via at least one second antenna,
wherein the first antenna and the second antenna are arranged on different sides of a shading obstacle so that different coverage areas result for the first antenna and the second antenna, and wherein the control module filters the vehicle-to-vehicle message based on a relevance of the vehicle-to-vehicle message for one or more receivers in the second antenna coverage area.

2. The device of claim 1, wherein the control module determines the relevance of the vehicle-to-vehicle message based on content of the vehicle-to-vehicle message.

3. The device of claim 2, wherein the vehicle-to-vehicle message comprises a position and/or trajectory of a vehicle from which the vehicle-to-vehicle message comes and wherein the control module determines the relevance of the vehicle-to-vehicle message based on the position and/or trajectory of the vehicle.

4. The device of claim 1, wherein the control module determines information about multiple reception of the vehicle-to-vehicle message by the one or more receivers and wherein the control module adapts the filtering of the vehicle-to-vehicle message also based on the information about the multiple reception.

5. The device of claim 4, wherein the control module determines the information about the multiple reception based on a position or trajectory of a vehicle from which the vehicle-to-vehicle message comes.

6. The device of claim 1, wherein the input interface receives vehicle-to-vehicle messages via the second antenna, wherein the control module determines information about a multiple reception of the vehicle-to-vehicle message by the one or more receivers and wherein the control module adapts the filtering of the vehicle-to-vehicle message also based on the information about the multiple reception,
   wherein the control module determines the information about the multiple reception based on the vehicle-to-vehicle messages received via the second antenna,
   and/or wherein the control module receives information about an acknowledgment of the filtered vehicle-to-vehicle message provided from the one or more receivers and wherein the control module determines the information about the multiple reception based on the information about the acknowledgment.

7. The device of claim 1, wherein the control module also provides information about the relay station for the one or more receivers.

8. The device of claim 7, wherein the control module provides the information about the relay station with the filtered vehicle-to-vehicle message for the one or more receivers, or wherein the control module determines an expected time of reception of the received vehicle-to-vehicle message based on previously received vehicle-to-vehicle messages and wherein the control module provides the information about the relay station as infrastructure-to-vehicle message based on the expected time of reception for the one or more receivers.

9. A method for a relay station to communicate by vehicle-to-vehicle messages via at least one antenna, the method comprising:
   receiving a vehicle-to-vehicle message via the at least one antenna;
   filtering the vehicle-to-vehicle message based on a relevance of the vehicle-to-vehicle message for one or more receivers in a coverage area of the at least one antenna; and
   providing the filtered vehicle-to-vehicle message via the at least one antenna if the vehicle-to-vehicle message is relevant for the one or more receiver,
   wherein the input interface receives the vehicle-to-vehicle message via at least one first antenna,
   wherein the output interface provides the filtered vehicle-to-vehicle message via at least one second antenna,
   wherein the first antenna and the second antenna are arranged on different sides of a shading obstacle so that different coverage areas result for the first antenna and the second antenna, and
   wherein the control module filters the vehicle-to-vehicle message based on a relevance of the vehicle-to-vehicle message for one or more receivers in the second antenna coverage area.

10. The method of claim 9, further comprising the control module determining the relevance of the vehicle-to-vehicle message based on content of the vehicle-to-vehicle message.

11. The method of claim 10, wherein the vehicle-to-vehicle message comprises a position and/or trajectory of a vehicle from which the vehicle-to-vehicle message comes and wherein the method further comprises the control module determining the relevance of the vehicle-to-vehicle message based on the position and/or trajectory of the vehicle.

12. The method of claim 10, further comprising:
   the control module determining information about multiple reception of the vehicle-to-vehicle message by the one or more receivers; and
   the control module adapting the filtering of the vehicle-to-vehicle message also based on the information about the multiple reception.

13. The method of claim 12, further comprising the control module determining the information about the multiple reception based on a position or trajectory of a vehicle from which the vehicle-to-vehicle message comes.

14. The method of claim 9, wherein the input interface receives vehicle-to-vehicle messages via the second antenna, wherein the method further comprises:
   the control module determining information about a multiple reception of the vehicle-to-vehicle message by the one or more receivers and wherein the control module adapts the filtering of the vehicle-to-vehicle message also based on the information about the multiple reception;
   the control module determining the information about the multiple reception based on the vehicle-to-vehicle messages received via the second antenna and/or receiving information about an acknowledgment of the filtered vehicle-to-vehicle message provided from the one or more receivers; and
   the control module determining the information about the multiple reception based on the information about the acknowledgment.

15. The method of claim 9, further comprising the control module also providing information about the relay station for the one or more receivers.

16. The method of claim 15, wherein the control module provides the information about the relay station with the filtered vehicle-to-vehicle message for the one or more receivers, or wherein the control module determines an expected time of reception of the received vehicle-to-vehicle message based on previously received vehicle-to-vehicle messages and wherein the control module provides the information about the relay station as infrastructure-to-vehicle message based on the expected time of reception for the one or more receivers.

* * * * *